(12) United States Patent
Lazarov et al.

(10) Patent No.: US 8,304,850 B2
(45) Date of Patent: Nov. 6, 2012

(54) INTEGRATED INFRARED SENSORS WITH OPTICAL ELEMENTS, AND METHODS

(75) Inventors: Kalin V. Lazarov, Tucson, AZ (US); Walter B. Meinel, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 287 days.

(21) Appl. No.: 12/645,267

(22) Filed: Dec. 22, 2009

(65) Prior Publication Data

US 2011/0147869 A1    Jun. 23, 2011

(51) Int. Cl.
*H01L 31/058* (2006.01)

(52) U.S. Cl. .............. 257/467; 257/414; 257/E31.001; 257/E31.093; 257/E31.127; 438/69; 250/338.1; 250/349

(58) Field of Classification Search .......... 257/414, 257/432, 467, E31.001, E31.002, E31.093, 257/E31.127, 433; 438/69; 250/338.1, 349
See application file for complete search history.

(56) References Cited

U.S. PATENT DOCUMENTS

| | | | |
|---|---|---|---|
| 5,589,689 A | 12/1996 | Koskinen | |
| 5,962,854 A * | 10/1999 | Endo | 250/349 |
| 6,677,654 B2 | 1/2004 | Kim et al. | |
| 6,828,560 B2 | 12/2004 | Lambert et al. | |
| 7,026,617 B2 * | 4/2006 | Mashio et al. | 250/338.1 |
| 2003/0146384 A1 * | 8/2003 | Logsdon et al. | 250/338.1 |
| 2004/0113076 A1 * | 6/2004 | Guo et al. | 250/338.1 |
| 2006/0060788 A1 * | 3/2006 | Uchida et al. | 250/343 |
| 2006/0062439 A1 | 3/2006 | Setlak | |
| 2007/0108388 A1 * | 5/2007 | Lane et al. | 250/353 |
| 2007/0287073 A1 * | 12/2007 | Goodwin | 430/5 |
| 2008/0179503 A1 | 7/2008 | Camargo et al. | |
| 2008/0304054 A1 * | 12/2008 | Goosens et al. | 356/237.4 |
| 2009/0134330 A1 | 5/2009 | Huppertz | |
| 2010/0289108 A1 | 11/2010 | Meinel et al. | |
| 2010/0327393 A1 | 12/2010 | Meinel et al. | |
| 2011/0147869 A1 | 6/2011 | Lazarov et al. | |

OTHER PUBLICATIONS

Chen-Hsun Du and Chengkuo Lee, "Investigation of Thermopile using CMOS Compatible Process and Front-side Si Bulk etching", Proc. SPIE vol. 4176, 168 (2000).*

"Development of a Deep Silicon Phase Fresnel Lens Using Gray-Scale Lithography and Deep Reactive Ion Etching," Journal of Microelectromechanical Systems, vol. 13, No. 1, Feb. 2004, pp. 113-120 (Brian Morgan, Christopher M. Waits, John Krizmanic and Reza Ghodssi).

(Continued)

*Primary Examiner* — A. Sefer
*Assistant Examiner* — Farid Khan
(74) *Attorney, Agent, or Firm* — John J. Patti; Wade J. Brady, III; Frederick J. Telecky, Jr.

(57) ABSTRACT

An infrared (IR) radiation sensor device (27) includes an integrated circuit radiation sensor chip (1A) including first (7) and second (8) temperature-sensitive elements connected within a dielectric stack (3) of the chip, the first temperature-sensitive element (7) being more thermally insulated from a substrate (2) than the second temperature-sensitive element (8). Bonding pads (28A) on the chip (1) are coupled to the first and second temperature-sensitive elements. Bump conductors (28) are bonded to the bonding pads (28A), respectively, for physically and electrically connecting the radiation sensor chip (1) to corresponding mounting conductors (23A). A diffractive optical element (21,22,23,31,32 or 34) is integrated with a back surface (25) of the radiation sensor chip (1) to direct IR radiation toward the first temperature-sensitive element (7).

26 Claims, 12 Drawing Sheets

OTHER PUBLICATIONS

"Micro-Heater on Membrane With Large Uniform-Temperature Area," IEEE Sensors 2006, EXCO, Daegu, Oct. 22-25, 2006, pp. 571-575 (Tie Li, Lei Wu, Yanxiang Liu, Lichun Wang and Yuelin Wang).

"MLX90614: Single and Dual Zone Infra Red Thermometer in TO-39," Microelectronic Integrated System Data Sheet Jul. 30, 2008.

"Investigation of Thermopile Using CMOS Compatible Process and Front-Side Si Bulk Etching," Micromachined Devices and Components VI, Proceedings of SPIE 2000, vol. 4176, pp. 168-178 (Chen-Hsun Du and Chengkuo Lee).

"CMOS-Compatible Fabrication of Thermopiles With High Sensitivity in the 3-5 μm Atmospheric Window," Sensors and Actuators B: Chemical 1254 (1), 2007, pp. 214-223 (Roncaglia, et al.).

* cited by examiner

INTEGRATED INFRARED SENSORS WITH OPTICAL ELEMENTS, AND METHODS

This invention is related to the assignee's co-pending applications:

Ser. No. 12/380,316, which is entitled "INFRARED SENSOR STRUCTURE AND METHOD," which was filed on Feb. 26, 2009, and which is incorporated herein by reference;

Ser. No. 12/380,318, which is entitled "ON-CHIP CALIBRATION SYSTEM AND METHOD FOR INFRARED SENSOR" and filed on Feb. 26, 2009;

Ser. No. 12/456,910, entitled "METHOD AND STRUCTURES FOR ETCHING CAVITY IN SILICON UNDER DIELECTRIC MEMBRANE" and filed on Jun. 24, 2009;

Ser. No. 12/454,257 (now U.S. Pat. No. 8,026,177), which is entitled "SILICON DIOXIDE CANTILEVER SUPPORT AND METHOD FOR SILICON ETCHED STRUCTURES" and filed on May 14, 2009;

Ser. No. 13/208,130, which is entitled "SILICON DIOXIDE CANTILEVER SUPPORT AND METHOD FOR SILICON ETCHED STRUCTURES" and filed on Aug. 11, 2011; and Ser. No. 13/208,098, which is entitled "SILICON DIOXIDE CANTILEVER SUPPORT AND METHOD FOR SILICON ETCHED STRUCTURES" and filed on Aug. 11, 2011.

BACKGROUND OF THE INVENTION

The present invention relates generally to various semiconductor-processing-compatible infrared (IR) sensor structures and fabrication methods, and more particularly to improved IR radiation sensing structures and processes which reduce size and cost of IR sensors and which provide smaller, more economical, more sensitive IR radiation intensity measurements. More particularly, the invention also relates to improved IR radiation sensing structures and processes which also avoid the costs and difficulties associated with discrete lenses as used in the closest prior art to collimate or shift the angle of incoming IR radiation, by integrating diffractive optical elements, such as Fresnel lenses or diffraction gratings, into an integrated circuit chip including an IR sensor.

The closest prior art is believed to include the article "Investigation Of Thermopile Using CMOS Compatible Process and Front-Side Si Bulk Etching" by Chen-Hsun-Du and Chengkuo Lee, Proceedings of SPIE Vol. 4176 (2000), pp. 168-178, incorporated herein by reference. Infrared thermopile sensor physics and measurement of IR radiation using thermopiles are described in detail in this reference. "Prior Art" FIGS. 1A and 1B herein show the CMOS-processing-compatible IR sensor integrated circuit chip in FIGS. 1 and 2, respectively, of the foregoing article. The closest prior art also is believed to include the Melexis MLX90614 "infrared thermometer" in a TO-39 package, generally as shown in "Prior Art FIG. 2. Information regarding fabrication of several kinds of Fresnel lenses, including Fresnel Zone Plate binary lenses, Phase Zone Plate binary lenses, and Phase Fresnel Lenses, in/on silicon is disclosed in the technical article "Development of a Deep Silicon Phase Fresnel Lens Using Gray-Scale Lithography and Deep Reactive Ion Etching" by Brian Morgan et al., Journal of Micro-Electromechanical Systems, Vol. 13, No. 1, February, 2004.

Referring to Prior Art FIG. 1A herein, the IR sensor chip includes a silicon substrate 2 having a CMOS-processing-compatible dielectric ($SiO_2$) stack 3 thereon including a number of distinct sub-layers. A N-type polysilicon (polycrystalline silicon) trace 11 and an aluminum trace M1 in dielectric stack 3 form a first thermocouple junction where one end of the polysilicon trace and one end of the aluminum trace are connected. (A "thermocouple group", as that term is used herein, is formed on a group of series-connected thermocouples. A "thermopile", as the term is used herein, is formed of a number of thermocouple groups connected in series.) Additional oxide layers and additional metal traces also may be included in dielectric stack 3. An oxide passivation layer 12A is formed on top of dielectric stack 3, and a nitride passivation layer 12B is formed on oxide passivation layer 12A. A number of silicon etchant openings 24 extend through nitride passivation layer 12 and dielectric stack 3 to the top surface of silicon substrate 2 and are used to etch a cavity 4 in silicon substrate 2 underneath the portion of dielectric stack 3 in which the thermopile is formed, to thermally isolate it from silicon substrate 2.

Prior Art FIG. 1A is taken along section line 1A-1A of Prior Art FIG. 1B, which is essentially similar to FIG. 2 of the above mentioned Du and Lee reference. Cavity 4 is etched underneath $SiO_2$ stack 3 by means of silicon etchant introduced through the various etchant openings 24, which are relatively large and irregular. FIG. 1B shows various metal-polysilicon strips MP1 each of which includes an aluminum strip M1 and a polysilicon strip 11 which makes electrical contact to the aluminum strip M1 as shown in FIG. 1B. The metal strips M1 run parallel to the polysilicon strips 11 and, except for the electrical contact between them as shown in FIG. 1A, are separated from polysilicon strips 11 by a sub-layer of $SiO_2$ stack 3. Although not shown in FIG. 1A, the dielectric material directly above metal strips M1 actually has corresponding steps which are indicated by reference numerals MP2 in FIG. 1B. The relatively large etchant openings 24 and their various angular shapes cause the "floating" membrane consisting of the various metal-polysilicon strips MP1 and the central section 3A of $SiO_2$ stack 3 supported by metal-polysilicon strips MP1 to be very fragile. Such fragility ordinarily results in an unacceptably large number of device failures during subsequent wafer fabrication, subsequent packaging, and ultimate utilization of the IR sensor of FIGS. 1A and 1B.

A second thermocouple group (not shown) essentially similar to the one shown in FIG. 1A is also formed in dielectric stack 3 directly over a silicon substrate 2 and is not thermally isolated from silicon substrate 2 and therefore is at the same temperature as silicon substrate 2. The first and second thermocouple groups are connected in series and form a single "thermopile". The various silicon etchant openings 24 are formed in regions in which there are no polysilicon or aluminum traces, as shown in the dark areas in FIG. 2 of the Du and Lee article.

Incoming IR radiation indicated by arrows 5 in Prior Art FIG. 1A impinges on the "front side" or "active surface" of the IR sensor chip. (The "back side" of the chip is the bottom surface of silicon substrate 2 as it appears in Prior Art FIG. 1A.) The incoming IR radiation 5 causes the temperature of the thermocouple junction supported on the "floating" portion of dielectric membrane 3 located directly above cavity 4 to be greater than the temperature of the second thermocouple junction (not shown) in dielectric membrane 3 which is not insulated by cavity 4.

Unfortunately, the floating membrane supporting one of the group of thermocouple junctions over the cavity as shown in FIG. 1 of Du and Lee (Prior Art FIG. 1A herein) is very fragile, because of the irregular sizes and spacings of the etchant openings and partly by the thinness of the dielectric layer 3.

The IR radiation sensor in Prior Art FIG. 1A measures the temperature difference T1-T2 and produces an output voltage proportional to that temperature difference. The aluminum trace and N-type polycrystalline silicon trace of which the first and second thermocouple junctions are formed both are available in a typical standard CMOS wafer fabrication process.

FIG. 3 of the Du and Lee article indicates that the IR sensor is mounted inside a metal package having a window through which ambient IR radiation passes to reach the thermopile in the packaged IR sensor chip. The IR sensor chip described in the Du and Lee article is not believed to have ever been commercially available.

Above mentioned Prior Art FIG. 2 shows a commercially available MLX90614 IR radiation sensor marketed by Melexis Microelectronic Integrated Systems. This device is packaged in a metal TO-39 package 9 having a planar silicon window 10 through which impinging IR radiation can pass in order to reach the packaged IR sensor.

The above described prior art IR sensors require large, expensive packages. The foregoing prior art IR radiation sensors need to block visible light while transmitting IR radiation to the thermopiles in order to prevent false IR radiation intensity measurements due to ambient visible light. To accomplish this, the packages typically have a silicon (or other material transmitting infrared radiation but blocking visible light) window or a window with baffles. Furthermore, the "floating" portion of dielectric membrane 3 over cavity 4 in Prior Art FIG. 1A is quite fragile. In many of the prior art IR sensors, the silicon cavity is etched from the "back side" of the silicon wafer. This creates a large opening span that is difficult to protect.

The prior art also is believed to include use of a discrete Fresnel lens in conjunction with an infrared sensor of the kind typically used in motion sensing alarms. Such devices include a relatively large plastic Fresnel lens, and the infrared sensor typically is a pyroelectric sensor which is substantially different than a thermopile sensor. The discreet Fresnel lens is used to collimate ambient IR radiation from a relatively large, distant source and focus it on to a relatively small IR sensor to improve its signal to noise ratio. Somewhat similarly to the Melexis prior art shown in FIG. 2, the commercially available Omega OS36-10-K infrared thermocouple is packaged in a cylindrical housing along with a conventional classical curved lens to collimate the incoming infrared radiation in order to increase the thermocouple sensitivity.

Alignment of a small thermopile sensor of the kind shown in the above mentioned Du and Lee article or included in the Melexis IR thermometer with a discrete collimating lens is difficult and expensive because of the relatively small size of the thermopile membrane. The thermopile might have a dimension of only approximately 200 microns across, so misalignment of the discrete collimating lens by more than approximately 50 microns may result in substantial errors in focusing the incoming IR radiation onto the thermopile. Furthermore, if the collimating lens is located a few centimeters from the thermopile, tilt of more than a few degrees of the plane of the collimating lens with respect to the plane of the thermopile will cause the focal point to be substantially misaligned with the thermopile. The degree of precision alignment typically needed is achievable but quite costly using conventional alignment methods.

It would be highly desirable to provide smaller, more economical, more sensitive, and more robust IR sensors than are known in the prior art for various applications such as non-contact measurement of temperature and remote measurement of gas concentrations.

Thus, there is an unmet need for an IR radiation sensor which is substantially smaller, more sensitive, and less expensive than the IR radiation sensors of the prior art.

There also is an unmet need for an IR radiation sensor which avoids the costly problems associated with the packaging of the prior art sensors and the alignment of discrete diffractive optical elements with thermopiles, thermocouple groups, or even individual thermocouples of the sensors.

There also is an unmet need for a low cost IR radiation sensor having a response which is sensitive to the wavelength of incoming IR radiation.

There also is an unmet need for a low-cost IR radiation sensor which is substantially smaller and more sensitive than the IR radiation sensors of the prior art, wherein the IR-radiation-sensitive elements are composed of thermocouples.

There also is an unmet need for a low-cost IR radiation sensor which is substantially smaller and more sensitive than the IR radiation sensors of the prior art, wherein the IR-radiation-sensitive elements are composed of temperature-sensitive resistive elements.

There also is an unmet need for a more accurate IR radiation sensor than has been found in the prior art.

There also is an unmet need for an IR radiation sensor which provides more sensitive, more accurate measurement of IR radiation than the IR radiation sensors of the prior art.

There also is an unmet need for a CMOS-processing-compatible IR radiation sensor chip which does not need to be packaged in a relatively large, expensive package having a discrete window.

There also is an unmet need for a CMOS-processing-compatible IR radiation sensor chip which is substantially more robust than those of the prior art.

There also is an unmet need for an improved method of fabricating an infrared radiation sensor.

There also is an unmet need for an improved method of fabricating a CMOS-processing-compatible IR sensor device which does not require bonding the CMOS-processing-compatible IR sensor chip in a relatively large, expensive package having an infrared window therein.

SUMMARY OF THE INVENTION

It is an object of the invention to provide an IR radiation sensor which is substantially smaller and less expensive than the IR radiation sensors of the prior art.

It is another object of the invention to provide a more accurate IR radiation sensor than has been found in the prior art.

It is another object of the invention to provide a low cost IR radiation sensor having a response which is sensitive to the wavelength of incoming IR radiation.

It is another object of the invention to provide a low-cost IR radiation sensor which is substantially smaller and more sensitive than the IR radiation sensors of the prior art, wherein the IR-radiation-sensitive elements are composed of thermocouples.

It is another object of the invention to provide a low-cost IR radiation sensor which is substantially smaller and more sensitive than the IR radiation sensors of the prior art, wherein the IR-radiation-sensitive elements are composed of temperature-sensitive resistive elements.

It is another object of the invention to provide an IR radiation sensor which avoids the costly problems associated with the packaging of the prior art sensors and the alignment of discrete diffractive optical elements with thermopiles, thermocouple groups, or even individual thermocouples of the sensors.

It is another object of the invention to provide an IR radiation sensor which provides more sensitive, more accurate measurement of IR radiation than the IR radiation sensors of the prior art.

It is another object of the invention to provide an IR radiation sensor chip which does not need to be packaged in a relatively large, expensive package having an infrared window.

It is another object of the invention to provide an IR radiation sensor chip which is substantially more robust than those of the prior art.

It is another object of the invention to provide an improved method of fabricating an infrared radiation sensor.

It is another object of the invention to provide an improved method of fabricating a CMOS-processing-compatible IR sensor device which does not require packaging the CMOS-processing-compatible IR sensor chip in a relatively large, expensive package having a window therein.

It is another object of the invention to provide an improved method of fabricating an IR sensor device which is more robust than those of the prior art.

Briefly described, and in accordance with one embodiment, the present invention provides an infrared (IR) radiation sensor device (27) which includes an integrated circuit radiation sensor chip (1A) including first (7) and second (8) temperature-sensitive elements connected within a dielectric stack (3) of the chip, the first temperature-sensitive element (7) being more thermally insulated from a substrate (2) than the second temperature-sensitive element (8). Bonding pads (28A) on the chip (1) are coupled indirectly or directly to one or both the first and second temperature-sensitive elements. Bump conductors (28) are bonded to the bonding pads (28A), respectively, for physically and electrically connecting the radiation sensor chip (1) to corresponding mounting conductors (23A). A diffractive optical element (21,22,23,31,32 or 33) is integrated in or on a back surface (25) of the radiation sensor chip (1) to direct IR radiation toward the first temperature-sensitive element (7). In the described embodiments, concentric regions of the Fresnel lens (21,22 or 23) are circular.

In one embodiment, the invention provides an infrared (IR) radiation sensor device (27) including an integrated circuit radiation sensor chip (1 or 1A) including first (7 in FIG. 3 or R2 in FIGS. 12-14) and second (8 in FIG. 3 or R4 in FIGS. 12-14) temperature-sensitive elements connected within a dielectric stack (3) of the radiation sensor chip (1), the first temperature-sensitive element (7 or R2) being more thermally insulated from a substrate (2) of the radiation sensor chip (1) than the second temperature-sensitive element (8 or R4). A plurality of bonding pads (28A) on the radiation sensor chip (1) are coupled to the first (7 or R2) and second (8 or R4) temperature-sensitive elements. A plurality of bump conductors (28) are bonded to the bonding pads (28A), respectively, for physically and electrically connecting the radiation sensor chip (1) to corresponding mounting conductors (23A), respectively. A diffractive optical element (21,22,23,31,32 or 33) is integrated on or in a back surface (25) of the radiation sensor chip (1). In the described embodiments, the first temperature-sensitive element (7 or R2) is insulated from the substrate (2) by means of a cavity (4) between the substrate (2) and the dielectric stack (3).

In one embodiment, the diffractive optical element includes a Fresnel lens (21,22, or 23) focused on a portion of the dielectric layer (3) bounding the cavity (4). In one embodiment, the Fresnel lens is a binary Fresnel lens (21) formed of concentric regions etched into the back surface (25) of the radiation sensor chip (1A). In another embodiment, the Fresnel lens is a binary Fresnel lens (22) formed of concentric rings of infrared-opaque material deposited on the back surface (25) of the radiation sensor chip (1A).

In yet another embodiment, the diffractive optical element includes a diffraction grating (33) formed of a plurality of elongated parallel rectangular regions (33A) etched into the back surface (25) of the radiation sensor chip (1A).

In one embodiment, the first (7) and second (8) temperature-sensitive elements include first (7) and second (8) thermocouple groups, respectively, connected in series to form a thermopile (7,8), and wherein the dielectric stack (3) is a semiconductor process dielectric stack including a plurality of $SiO_2$ sublayers (3-1, 2 . . . 6) and various polysilicon traces, titanium nitride traces, tungsten contacts, and aluminum metallization traces between the various sublayers patterned to provide the first (7) and second (8) thermocouple groups connected in series to form the thermopile (7,8). CMOS circuitry (45) is coupled between first (+) and second (−) terminals of the thermopile (7,8) to receive and operate upon a thermoelectric voltage (Vout) generated by the thermopile (7,8) in response to infrared (IR) radiation received by the radiation sensor chip (1 or 1A), the CMOS circuitry also being coupled to the bonding pads (28A).

In the described embodiments, the substrate (2) is composed of silicon to pass infrared radiation to the thermopile (7,8) and block visible radiation. A passivation layer (12) is disposed on the dielectric stack (3), a plurality of generally circular etchant openings (24) being located between the various traces and extending through the passivation layer (12) and the dielectric layer (3) to the cavity (4) for introducing silicon etchant to produce the cavity (4) by etching the silicon substrate (2).

In one embodiment, the first (R2) and second (R4) temperature-sensitive elements include first (R2) and second (R4) resistive devices, respectively.

In one embodiment, the invention provides a method for making a radiation sensor device (27), including providing first (7 in FIG. 3 or R2 in FIGS. 12-14) and second (8 in FIG. 3 or R4 in FIGS. 12-14) temperature-sensitive elements connected in a dielectric stack (3) of a radiation sensor chip (1A), thermally insulating the first temperature-sensitive element (7 or R2) from a substrate (2) of the radiation sensor chip (1), forming a plurality of bonding pads (28A) on the radiation sensor chip (1), the bonding pads (28A) being coupled to the first (7 or R2) and second (8 or R4) temperature-sensitive elements, bonding the bonding pads (28A) to a plurality of corresponding mounting conductors (23A), respectively, and integrating a diffractive optical element (21,22,23,31,32 or 33) on a back surface (20) of the radiation sensor chip (1). In the described embodiments, the first temperature-sensitive element (7 or R2) are insulated from the substrate (2) by etching a cavity (4) in the substrate (2) between the first temperature-sensitive element (7 or R2) and the substrate (2).

In one embodiment, a Fresnel lens (21,22, or 23) is formed on a back surface (25) of the radiation sensor chip (1) so that the Fresnel lens is focused on a portion of the dielectric layer (3) bounding the cavity (4). In another embodiment, a diffraction grating (33) is formed on a back surface (25) of the radiation sensor chip (1) so that the diffraction grating directs infrared radiation to the first temperature-sensitive element (7 or R2). In one embodiment, a Fresnel lens is formed as a binary Fresnel lens (21) by etching a plurality of concentric regions into the back surface (25) of the radiation sensor chip (1A).

In one embodiment, the invention provides an infrared radiation sensor device (27), including a radiation sensor chip (1 or 1A) including first (7 in FIG. 3 or R2 in FIGS. 12-14) and second (8 in FIG. 3 or R4 in FIGS. 12-14) temperature-sensitive elements connected in a dielectric stack (3) of a radiation sensor chip (1A), means (4) for thermally insulating the first temperature-sensitive element (7 or R2) from a substrate (2) of the radiation sensor chip (1), bump conductor means (28) bonded to a plurality of bonding pads (28A) coupled to the thermopile (7,8), respectively, for physically and electrically connecting the radiation sensor chip (1) to corresponding mounting conductors (23A), and diffractive optical means (21,22,23,31,32 or 33) integrated in or on a back surface (25) of the radiation sensor chip (1) for directing incoming infrared radiation to a portion of the dielectric stack (3) bounding the thermally insulating means (4).

DETAILED DESCRIPTION OF THE PREFERRED EMBODIMENTS

Figure 3:
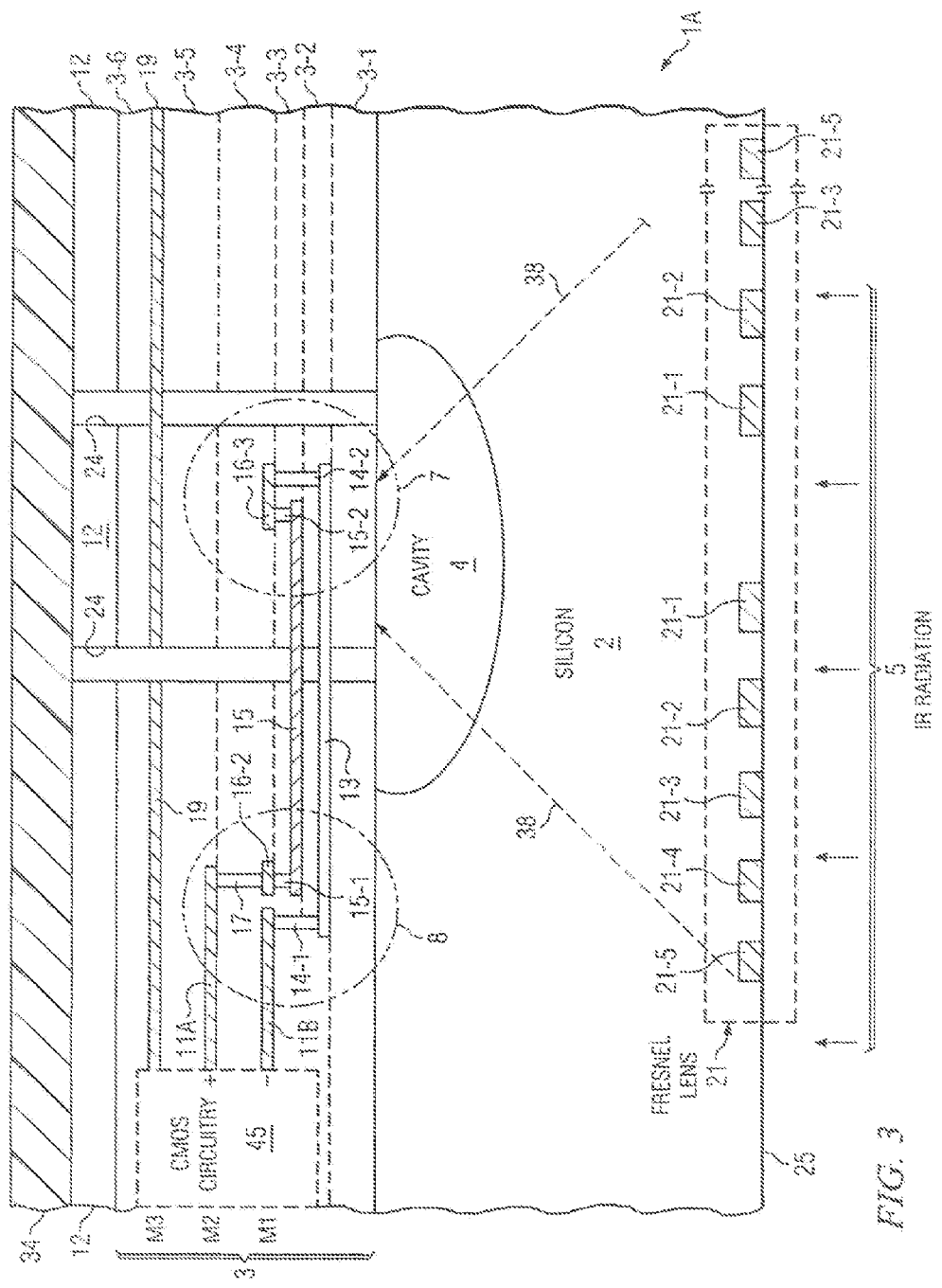
FIG. 3 is a section view of a CMOS-processing-compatible IR sensor thermocouple chip including a silicon Fresnel lens pattern etched in the back surface of the chip in accordance with the present invention.
Figure 5:
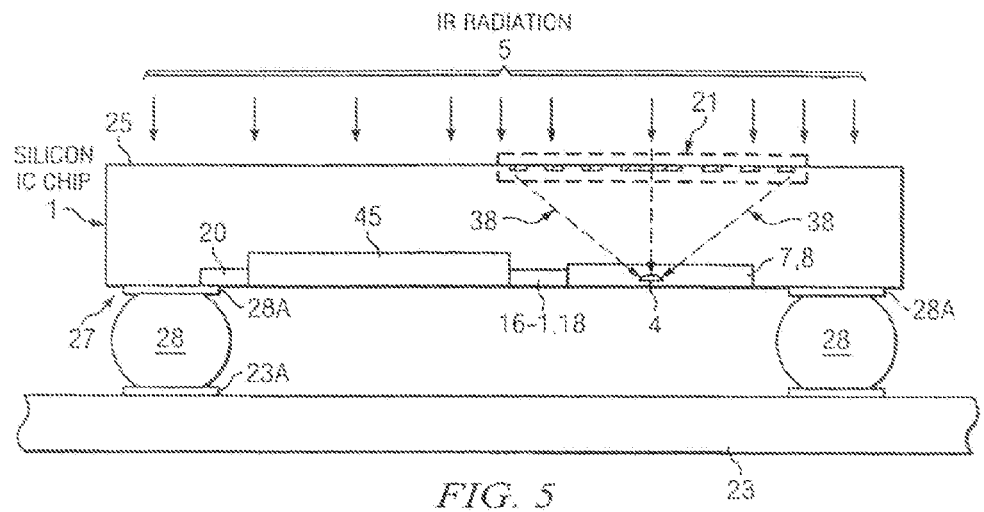
FIG. 5 is a schematic section view diagram of the CMOS-processing-compatible IR sensor of FIG. 3 implemented in a Wafer Chip Scale Package (WCSP).

FIG. 3 shows a detailed cross-section of an integrated circuit IR sensor chip 1A which includes silicon substrate 2 and cavity 4 therein, generally as shown in FIG. 5 except that chip 1 as shown in FIG. 5 is inverted. Silicon substrate 2 includes a thin layer (not shown) of epitaxial silicon into which cavity 4 is etched, and also includes the silicon wafer substrate on which the original epitaxial silicon layer is grown. IR sensor chip 1 includes $SiO_2$ stack 3 formed on the upper surface of silicon substrate 2. $SiO_2$ stack 3 includes multiple oxide layers 3-1, 2 . . . 6 as required to facilitate fabrication within $SiO_2$ stack 3 of N-doped polysilicon layer 13, titanium nitride layer 15, tungsten contact layers 14-1, 14-2, 15-1, 15-2, and 17, first aluminum metallization layer M1, second aluminum metallization layer M2, third aluminum metallization layer M3, and various elements of CMOS circuitry in block 45. (Note however, that in some cases it may be economic and/or practical to provide only thermopile 7,8 (or even a single thermocouple) on IR sensor chip 1 and provide all signal amplification, filtering, and/or digital or mixed signal processing on a separate chip or chips.)

The various layers shown in dielectric stack 3, including polysilicon layer 13, titanium nitride layer 15, aluminum first metallization layer M1, aluminum second metallization layer M2, and aluminum third metallization layer M3 each are formed on a corresponding oxide sub-layer of dielectric stack 3. Thermopile 7,8 thus is formed within $SiO_2$ stack 3. Cavity 4 in silicon substrate 2 is located directly beneath thermocouple group 7, and therefore thermally insulates thermocouple group 7 from silicon substrate 2. However thermocouple group 8 is located directly adjacent to silicon substrate 2 and therefore is at essentially the same temperature as silicon substrate 2. A relatively long, narrow polysilicon trace 13 is disposed on a $SiO_2$ sub-layer 3-1 of dielectric stack 3 and extends between tungsten contact 14-2 (in thermocouple group 7) and tungsten contact 14-1 (in thermocouple group 8). Titanium nitride trace 15 extends between tungsten contact 15-1 (in thermocouple group 8) and tungsten contact 15-2 (in thermocouple group 7). Thus, polysilicon trace 13 and titanium nitride trace 15 both function as parts of thermopile 7,8. Thermopile 7,8 is referred to as a poly/titanium-nitride thermopile, since the Seebeck coefficients of the various aluminum traces cancel and the Seebeck coefficients of the various tungsten contacts 14-1, 14-2, 15-2, and 17 also cancel because the temperature difference across the various connections is essentially equal to zero.

The right end of polysilicon layer 13 is connected to the right end of titanium nitride trace 15 by means of tungsten contact 14-2, aluminum trace 16-3, and tungsten contact 15-2 so as to form "hot" thermocouple group 7. Similarly, the left end of polysilicon layer 13 is connected by tungsten contact 14-1 to aluminum trace 11B and the left end of titanium nitride trace 15 is coupled by tungsten contact 15-1, aluminum trace 16-2, and tungsten contact 17 to aluminum trace 11A, so as to thereby form "cold" thermocouple group 8. The series-connected combination of the two thermocouple groups 7 and 8 forms thermopile 7,8.

Aluminum metallization interconnect layers M1, M2, and M3 are formed on the $SiO_2$ sub-layers 3-3, 3-4, and 3-5, respectively, of dielectric stack 3. A conventional silicon nitride passivation layer 12 is formed on another oxide sublayer 3-6 of dielectric layer 3. A number of relatively small-diameter etchant holes 24 extend from the top of passivation layer 12 through dielectric stack 3 into cavity 4, between the various patterned metallization (M1, M2 and M3), titanium nitride, and polysilicon traces which form thermocouple groups 7 and 8. As subsequently explained, silicon etchant is introduced through etchant holes 24 to etch cavity 4 into the upper surface of silicon substrate 2. Note that providing the etchant openings 24 is not conventional in standard CMOS processing or bipolar integrated circuit processing, nor is the foregoing silicon etching used in this manner in standard CMOS processing or bipolar integrated circuit processing.

Figure 11:
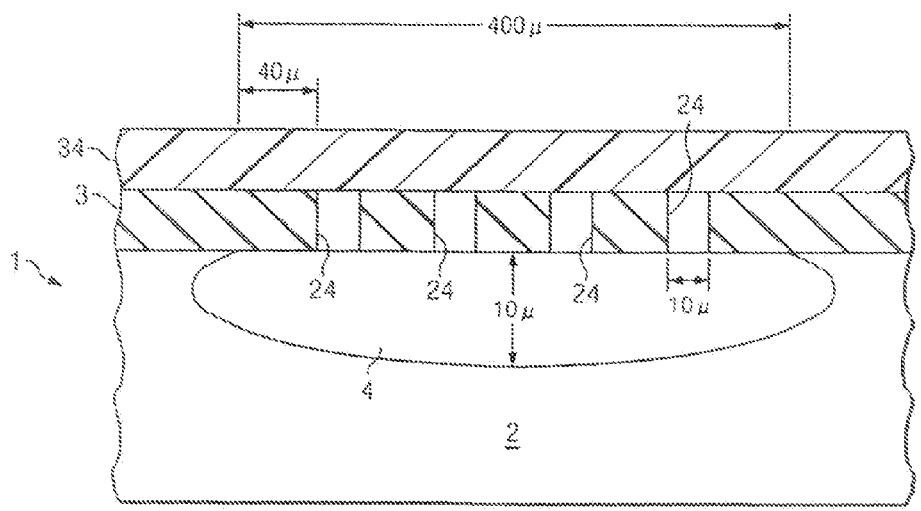
FIG. 11 is a section view which illustrates typical minimum dimensions, in microns, of various features of cavity 4 and the etchant openings extending through the floating membrane portion of dielectric layer 3.

The small diameters of etchant holes 24 are selected in order to provide a more robust floating thermopile membrane, and hence a more robust IR radiation sensor. The diameters of the etchant hole openings 24 can vary from 10 microns to 30 microns with a spacing ratio of 3:1 maximum to 1:1. The spacings between the various etchant openings 24 can be in a range from approximately 10 to 60 microns. The smaller spacing ratio (i.e., the distance between the edges of the holes divided by the diameter of the holes) has the disadvantage that it results in lower total thermopile responsivity, due to the packing factor (the number of thermocouple groups per square millimeter of surface area) of the many thermocouple groups (see FIGS. 6, 7A and 7B) of which each of thermocouple groups 7 and 8 actually is composed. However, a smaller spacing ratio results in a substantially faster silicon etching time. Therefore, there is a trade-off between the robustness of the membrane and the cost of etching of cavity 4. (FIG. 11 illustrates minimum dimensions, in microns, of the various features of cavity 4 and the "floating" membrane portion of dielectric layer 3 which supports thermocouple group 7 above cavity 4, for an embodiment of the invention presently under development. In that embodiment the etchant openings are at least 10 microns (μm) in diameter and are spaced at least approximately 10 μm apart. The span of cavity 4 is typically 400 μm, and its depth is at least 10 μm.)

Referring back to FIG. 3, a roll-on epoxy film 34 may be provided on nitride passivation layer 12 to permanently seal the upper ends of etch openings 24 and to reinforce the "floating membrane" portion of dielectric layer 3. Although there may be some applications of the invention which do not require epoxy cover plate 34, the use of epoxy cover plate 34 may be an important aspect of providing a reliable WCSP package configuration of the IR sensors of the present invention. For example, epoxy cover plate 34 may be substantially thicker (e.g., roughly 16 microns) than the entire thickness (e.g., roughly 6 microns) of dielectric stack 3.

The back surface 25 of silicon substrate 2 receives IR radiation 5 and passes it through chip 1A to SiO$_2$ stack 3 while filtering out any ambient visible light. Thermocouple group 7 is thermally insulated, by cavity 4, from silicon substrate 2. Thermocouple group 8 is formed by dissimilar materials within dielectric stack 3 directly adjacent to silicon substrate 2. The portion of SiO$_2$ stack 3 spanning the opening of cavity 4 forms a thin "floating" membrane which supports thermocouple group 7. IR radiation impinges uniformly on the back surface 25 of silicon substrate 2, differentially heating thermocouple groups 7 and 8. This results in the temperature T1 of thermocouple group 7 and the temperature T2 of thermocouple group 8 being different because of the insulative or thermal resistance properties of cavity 4. The thermoelectric output voltage difference Vout between thermopile terminals 11A and 11B in FIG. 3 is generally indicated by the simplified expression $$Vout = (T1-T2)(S1-S2),$$

where T1−T2 is the temperature difference between the two thermocouple groups 7 and 8, and where S1 and S2 are the Seebeck coefficients of thermopile 7,8.

The differential voltage Vout generated between (−) conductor 11B and (+) conductor 11A can be applied to the input of the CMOS circuitry in block 45. Block 45 can include gain/filter amplifier and various "mixed signal" circuitry 45B as shown in FIG. 9A of above mentioned pending patent application Ser. No. 12/380,316.

Figure 1A:
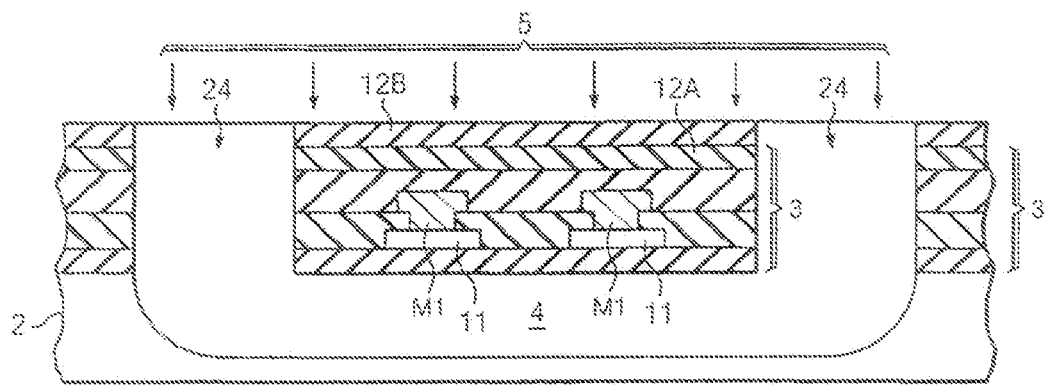
FIG. 1A is a section view diagram of a prior art IR radiation detector thermopile supported in a membrane formed in a CMOS-processing-compatible process.
Figure 1B:
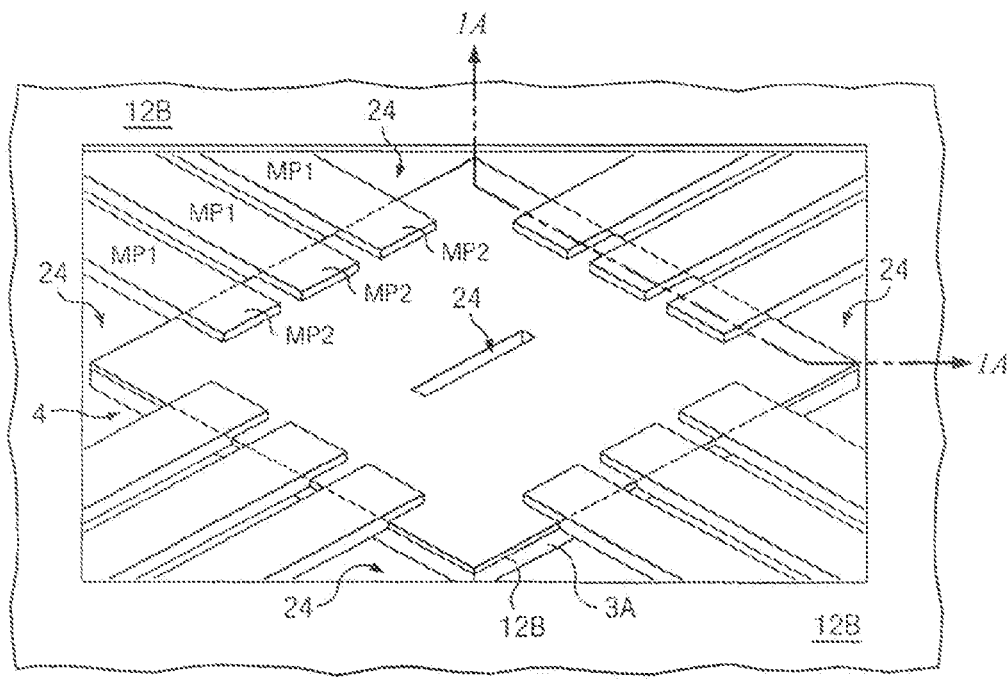
FIG. 1B is a top perspective view of the prior art IR radiation detector shown in FIG. 1A.
Figure 2:
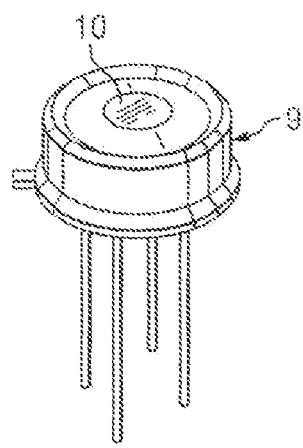
FIG. 2 is a diagram of a prior art infrared detector in a cylindrical metal package having a window at one end to focus incoming infrared radiation on a thermopile.

Still referring to FIG. 3, in accordance with one embodiment of the present invention a "digital" Fresnel lens 21 is formed on the back surface of silicon chip 1A by etching a circular pattern into back surface 25, directly below cavity 4 and thermocouple group 7. Fresnel lens 21 includes a cylindrical center region 21-1 etched a precise distance, corresponding to the wavelength range of incoming IR radiation 5 impinging on back surface 25 of silicon layer 2. A suitable number (typically 100 or more) of cylindrical regions 21-2, 21-3 ... 21-5 of the same depth as region 21-1 concentric with center region 21-1 also are etched into the back surface 25 as shown. One skilled in the art can readily provide the depths, widths, and pitches of the etched regions. For example, for a Phase Zone Plate (see FIG. 1(b) in the previously mentioned Brian Morgan et al. reference), if the IR wavelength λ is 10.6 microns (i.e., room temperature infrared), and the refractive material is silicon with its index of refraction of n=3.4, the depth of the etched regions is λ/(2*n)=1.56 um. Current DRIE (deep reactive ion etching) processes are capable of cutting through the entire wafer (i.e., providing an etch depth of approximately 300 microns) with aspect ratio of 10 or more. For a lens focal length of 300 microns, the radius of the central Fresnel zone (the centered circle in the FIG. 4) would be 30 microns. The width and pitch of the etched rings decreases towards the outer edge of the Fresnel lens, and, for example, the width of the 10th ring may be 5 microns, and the width of the 100th ring may be reduced to 2 microns. The practical limit depends on the etching process being used. For a Fresnel Zone Plate (metal masking), the widths and pitch of the deposited rings will be exactly the same as for the foregoing etched rings.

Figure 4:
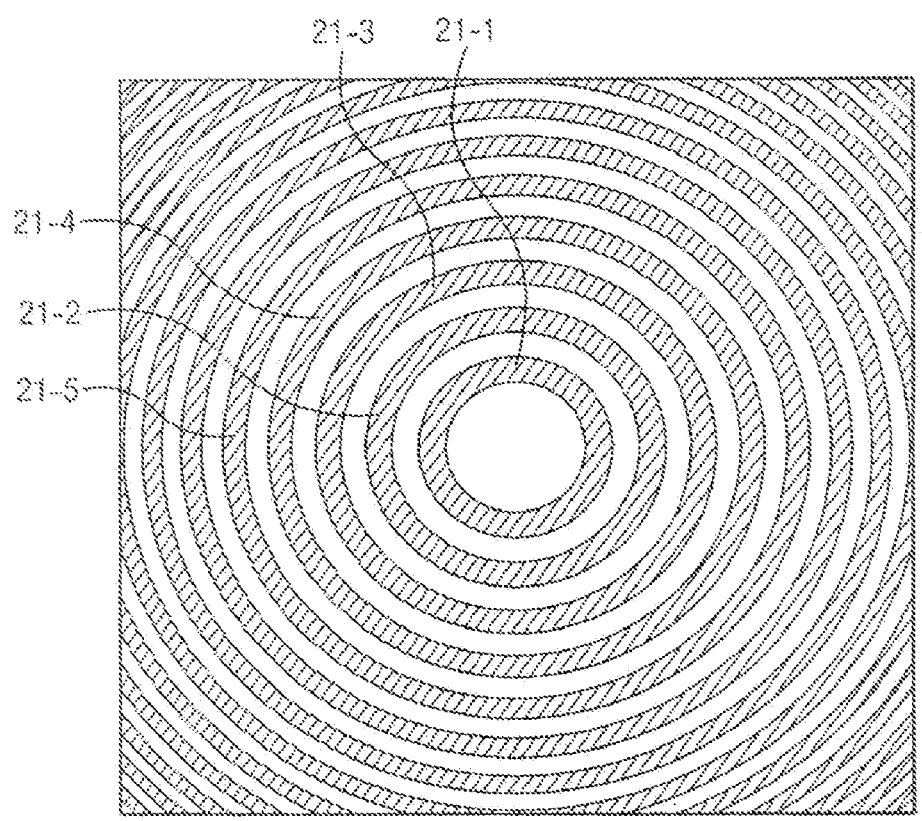
FIG. 4 shows a plan view of the Fresnel lens shown in FIG. 3

FIG. 4 shows a plan view of Fresnel lens 21 etched in back surface 25 in FIG. 3. Dashed-line arrows 38 illustrate how IR radiation 5 is focused generally onto the central bottom portion of SiO$_2$ stack 3 bounding cavity 4. (Note that the Fresnel lens pattern is not necessarily circular; a different pattern might be chosen to optimize differential heating of the two thermocouple groups 7 and 8 which form thermopile 7,8. In any case, the term "concentric" as used herein applies to "parallel" rings forming a Fresnel lens, whether circular, elliptical, or some other shape.)

Fresnel lens 21 in FIG. 3 is etched into back surface 25 of silicon layer 2 of chip 1A using conventional photolithography and silicon etching, e.g., deep-reactive ion etching (DRIE). Silicon is transparent to infrared radiation, so an infrared camera that "looks" through silicon chip 1A can see an image of, for example, an alignment cross previously formed on the opposite surface of silicon chip 1A. This allows precise alignment of a photolithography mask on back surface 25 of chip 1A with respect to the cross. The alignment mask on back surface 25 can be used to etch or otherwise form Fresnel lens 21 on back surface 25 in precise alignment with cavity 4 to within an accuracy of a few microns. Fresnel lens 21 therefore can be integrated on back surface 25 in precise alignment with features of cavity 4 and thermocouple group 7, at low additional cost.

Typically, each feature of Fresnel lens 21 is approximately half of the IR radiation wavelength. Imagine a Fresnel lens having a diameter of about 500 microns. Half of a wavelength is about 4 microns. The cavities 4 of the prior art IR sensor chips are etched from the back surface of the integrated circuit chip, and that eliminates the possibility of forming a Fresnel lens on the back of the chip.

Use of "binary" diffractive optical elements may be beneficial if it is desired to perform a differential infrared measurement and to differentiate wavelength.

FIG. 5 shows a partial section view including an IR sensor device 27 which includes above described IR sensor chip 1A inverted and to provide chip 1 as part of a modified WCSP (Wafer Chip Scale Package), wherein various solder bumps 28 are bonded to corresponding specialized solder bump bonding pads 28A on IR sensor chip 1. The modified WCSP technique indicated in FIG. 5 does not include any encapsulation material on the top surface of IR sensor chip 1, in order to avoid blocking the incident IR radiation 5. The various solder bumps 28 are also bonded to corresponding traces 23A on a circuit board 23 or other insulative surface. As described with reference to FIG. 3, Fresnel lens 21 in FIG. 5 focuses the incoming radiation onto thermocouple group 7 adjacent to cavity 4, as indicated by focused beam 38.

Figure 6:
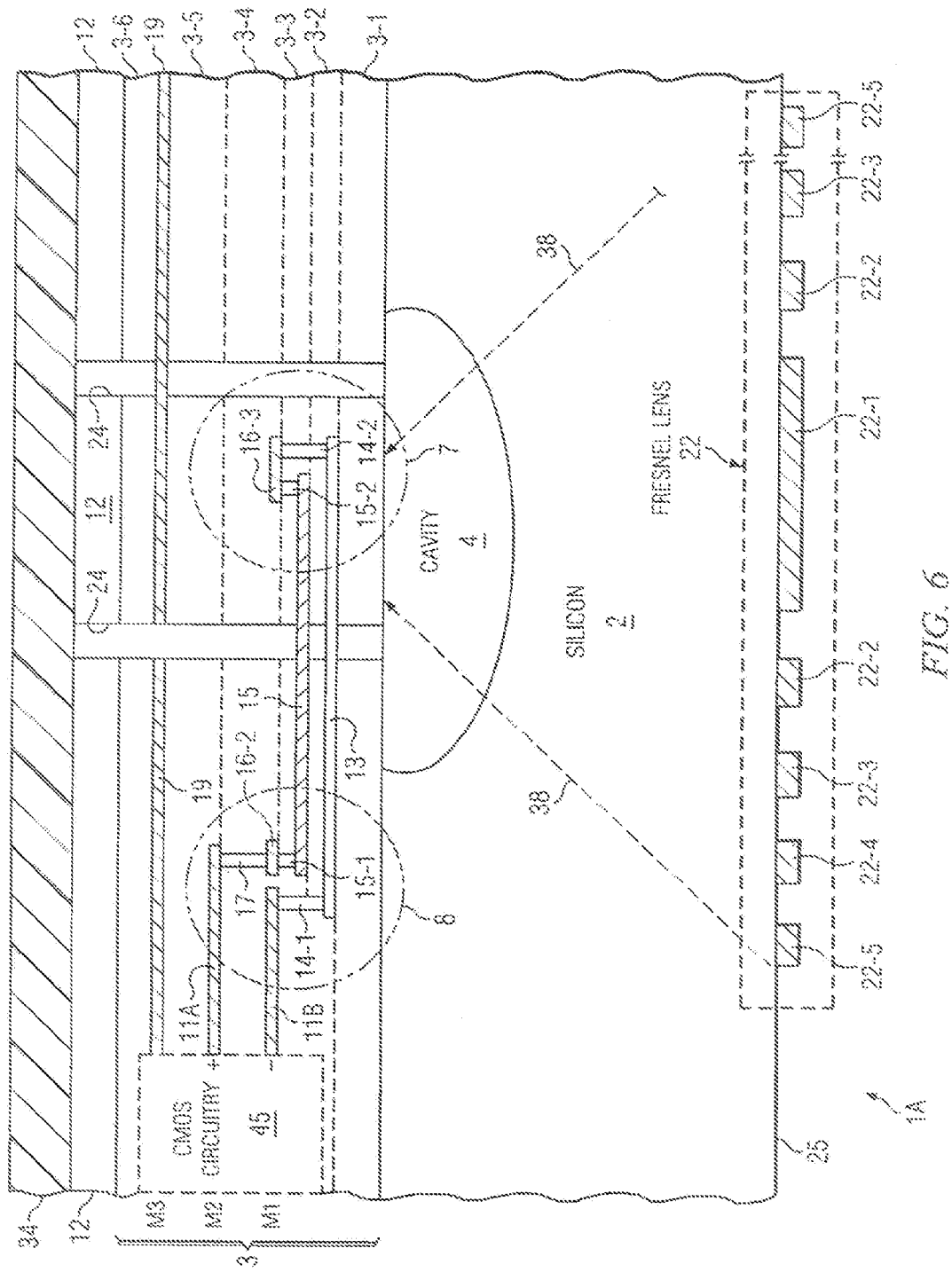
FIG. 6 is a section view of a CMOS-processing-compatible IR sensor thermocouple chip including a Fresnel lens formed of metallization deposited on the back surface of the silicon chip.

FIG. 6 shows integrated circuit IR sensor chip 1A in accordance with another embodiment of the present invention wherein "digital" or "binary" Fresnel lens 22 is formed on back surface 25 of silicon chip 1A by depositing a circular, concentric metallization pattern on back surface 25 of silicon layer 2, directly below cavity 4 and thermocouple group 7. Fresnel lens 22 includes a cylindrical center region 22-1 deposited on back surface 25, corresponding to the wavelength range of incoming IR radiation 5. A suitable number of cylindrical regions 22-2, 22-3 ... 22-5 concentric with center region 22-1 also are deposited on back surface 25 of silicon layer 2. In this embodiment, a portion of ambient IR radiation 5 which introduces no phase shift passes through Fresnel lens 22, and the remaining portion of ambient IR radiation 5 is blocked. Although only half the incoming IR energy is passed through Fresnel lens 22 and focused as indicated by focused beam 38, it usually is sufficient because the incoming IR radiation 5 can be focused from an area significantly larger than the area of the thermopile sensor. For example, if the focusing efficiency of the Fresnel zone plate (using metallization) is only 10%, but the area of the Fresnel lens is 100 times larger than the sensor membrane, then the total optical gain is 10.

Figure 7:
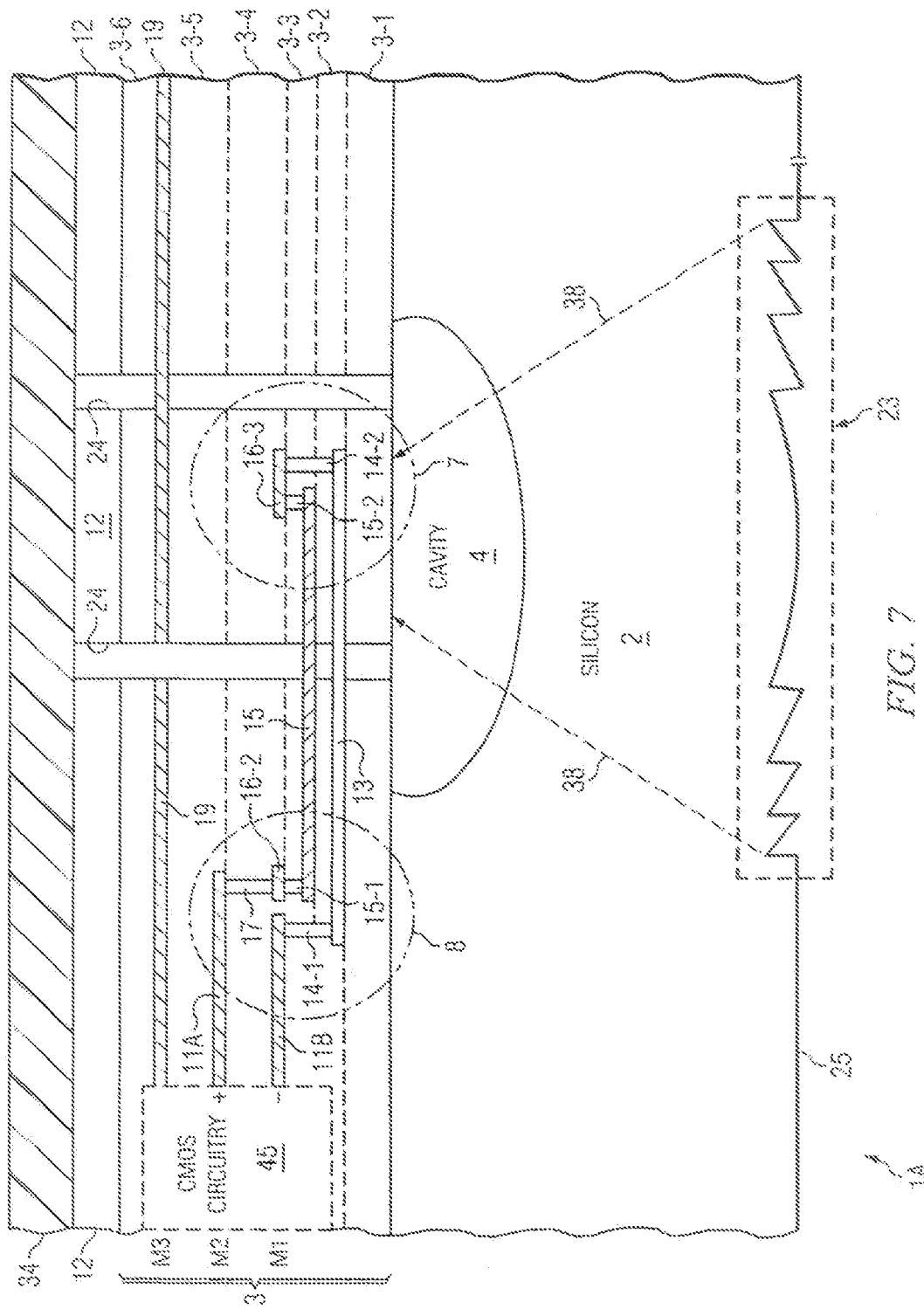
FIG. 7 is a section view of a CMOS-processing-compatible IR sensor thermocouple chip including a Fresnel lens pattern etched in the silicon of the back surface of the chip in accordance with the present invention.

FIG. 7 shows integrated circuit IR sensor chip 1A in accordance with another embodiment of the present invention wherein a conventional (i.e., non-binary) Fresnel lens 23 is etched into the back surface of silicon chip 1A by means of conventional gray-scale etching to form a circular pattern into back surface 25 of silicon layer 2 directly below cavity 4 and thermocouple group 7. Fresnel lens 23 includes a semispherical center region surrounded by a plurality of semispherical regions concentric with the center section. This embodiment of the invention may be useful if there is a broad spectrum of incoming radiation.

Figure 8:
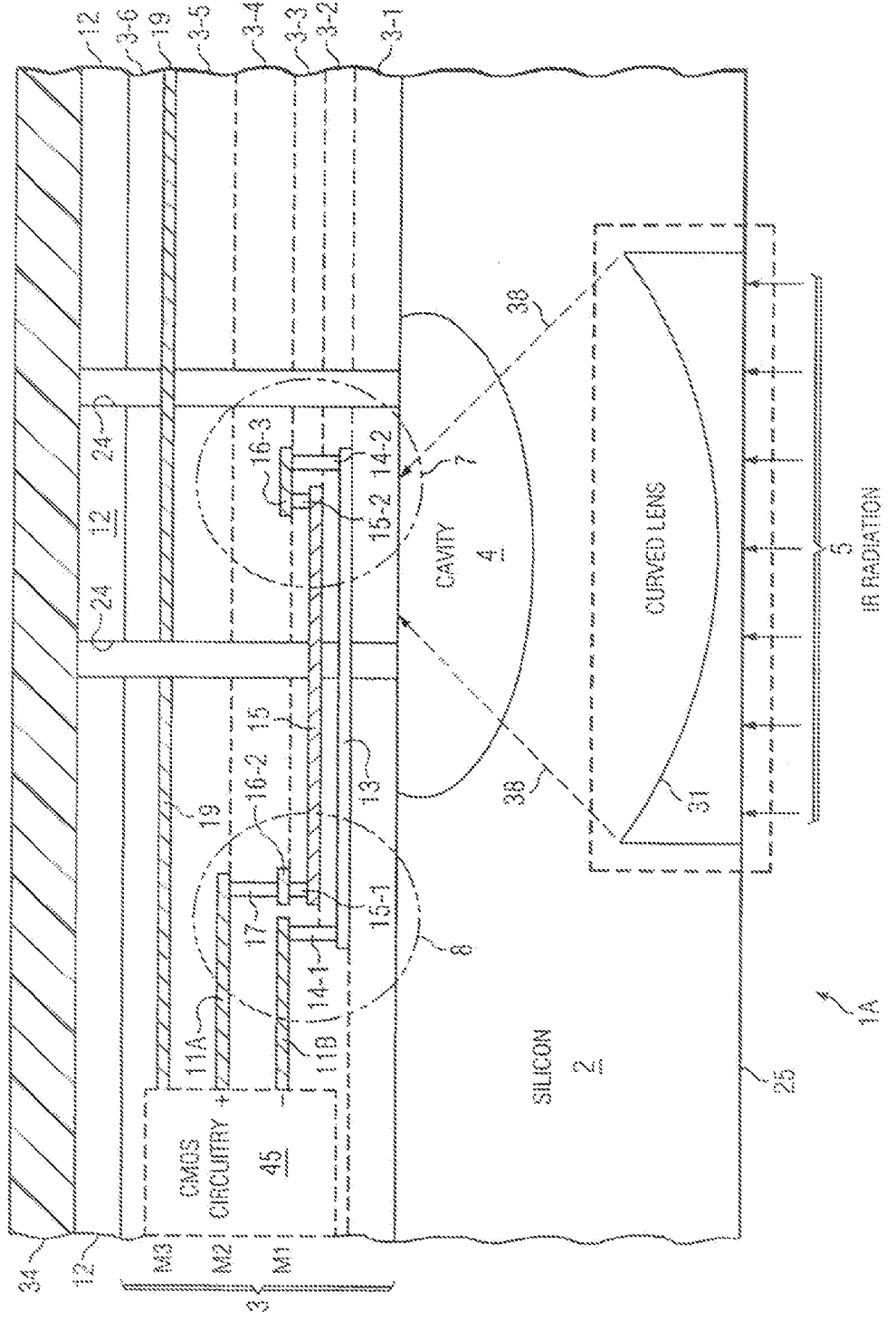
FIG. 8 is a section view of a CMOS-processing-compatible IR sensor thermocouple chip including a conventional curved lens etched in the silicon of the back surface of the chip.

FIG. 8 shows integrated circuit IR sensor chip 1A in accordance with yet another embodiment of the present invention wherein a conventional curved lens 31 is etched into the back surface of silicon chip 1A. This embodiment of the invention may be practical in some cases.

Figure 9:
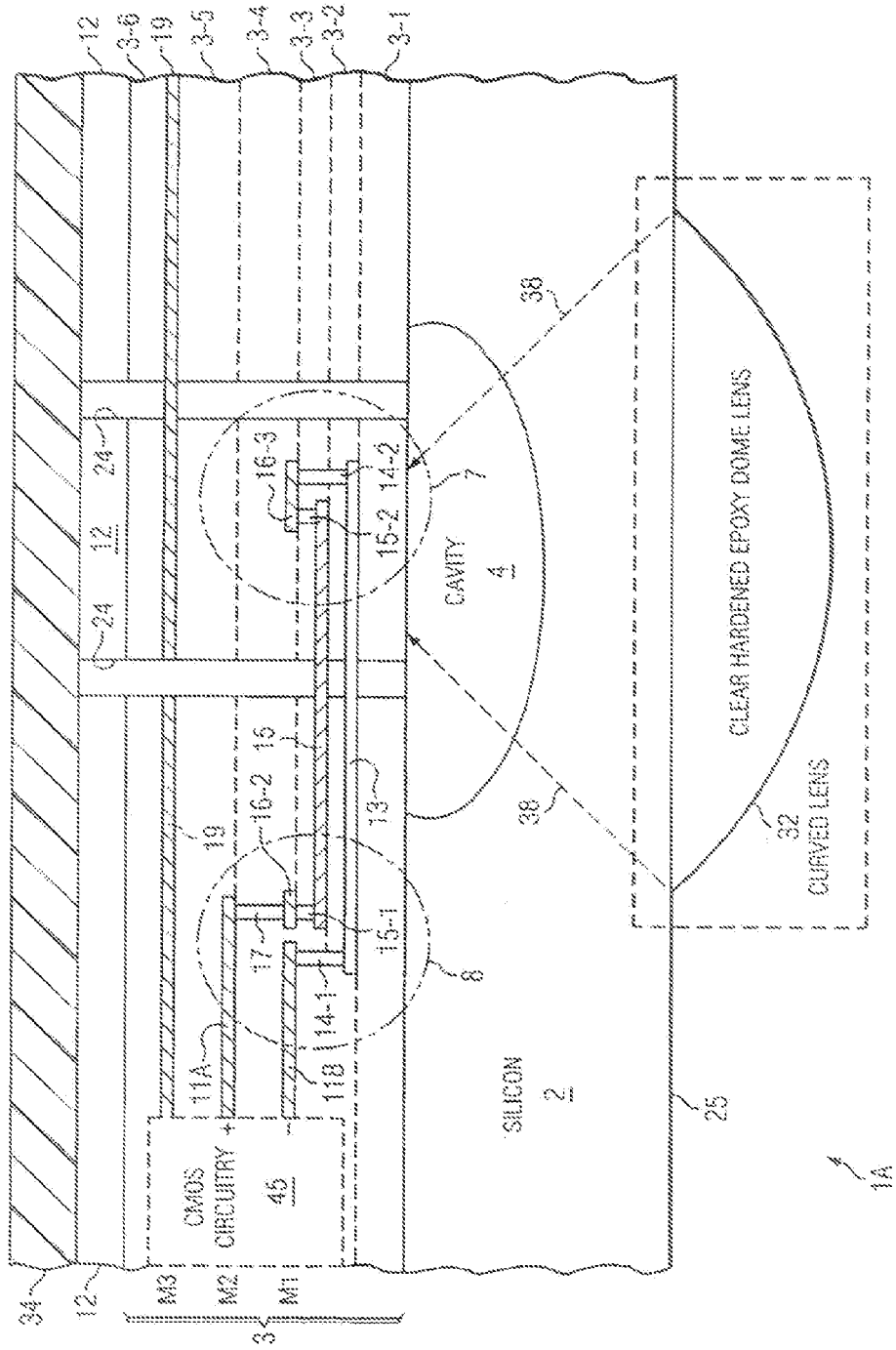
FIG. 9 is a section view of a CMOS-processing-compatible IR sensor thermocouple chip including a conventional curved lens composed of a clear, hardened epoxy dome lens initially deposited in which would form on the back surface of the chip.

FIG. 9 shows integrated circuit IR sensor chip 1A in accordance with yet another embodiment of the present invention wherein a conventional curved lens 33 is formed on back surface 25 of silicon chip 1A by placing liquid with a high index of refraction, such as epoxy, on back surface 25 and allowing it to solidify to provide a curved, generally semispherical lens. (They use of clear epoxy as a lens is common in light emitting diodes (LEDs).)

Figure 10:
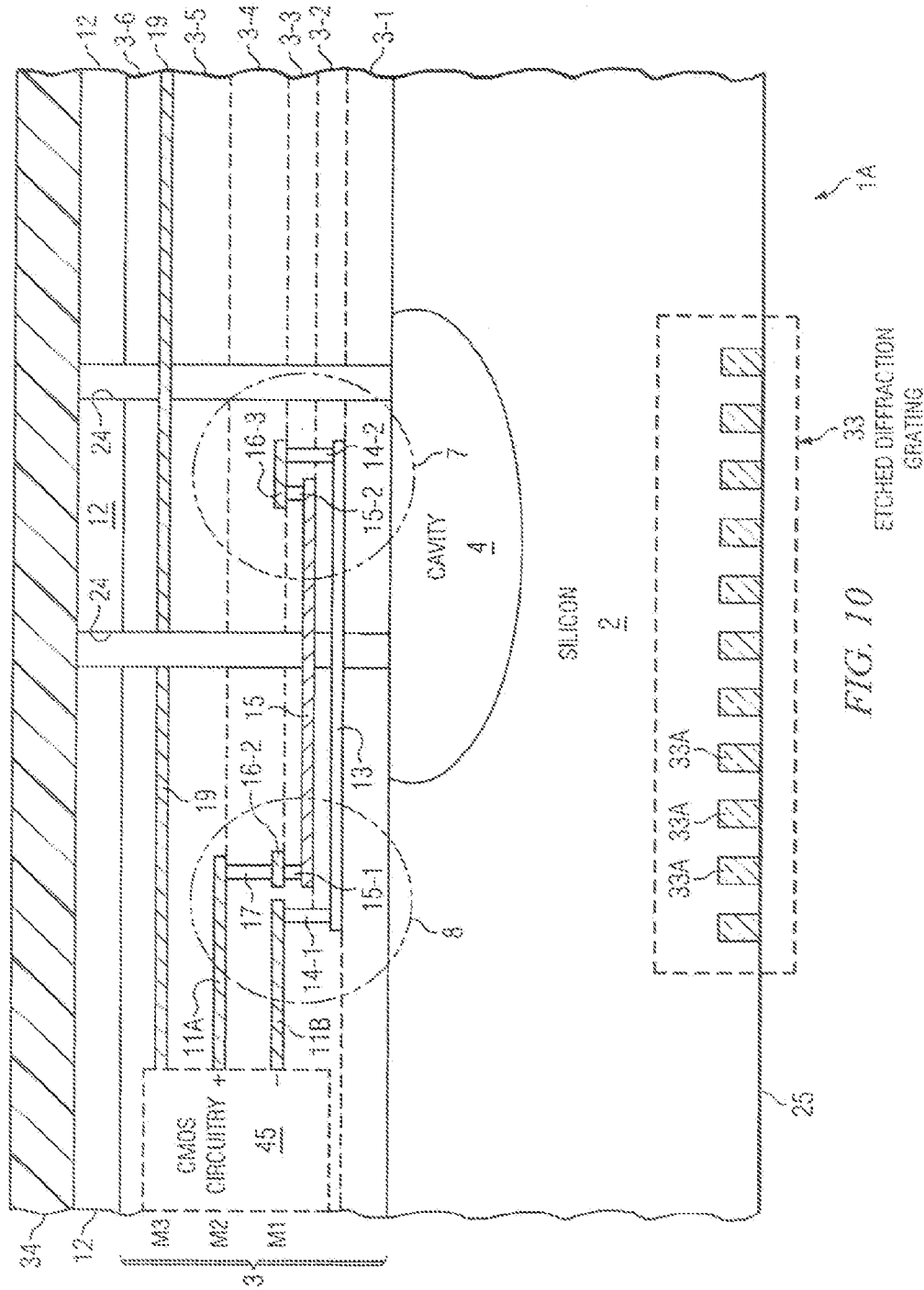
FIG. 10 is a section view of a CMOS-processing-compatible IR sensor thermocouple chip including a diffraction grating pattern etched in the back surface of the chip in accordance with the present invention.

FIG. 10 shows integrated circuit IR sensor chip 1A in accordance with still another embodiment of the present invention wherein a diffraction grating 33 is formed on the back surface 25 of silicon chip 1A by etching a suitable number of elongated rectangular regions 33A in back surface 25 of silicon layer 2 directly below cavity 4 and thermocouple group 7. Alternatively, a suitable number of rectangular metallization strips could be deposited on the back surface of silicon layer 2 directly below cavity 4 and thermocouple group 7 to form a similar diffraction grating. Such a diffraction grating could be useful in various wavelength-sensitive applications, for example, in carbon monoxide sensors or other gas sensors. (Current applications of wavelength-sensitive IR sensors use expensive filters that utilize materials of alternate or different indexes of refraction or thicknesses, and are very expensive.)

Figure 12:
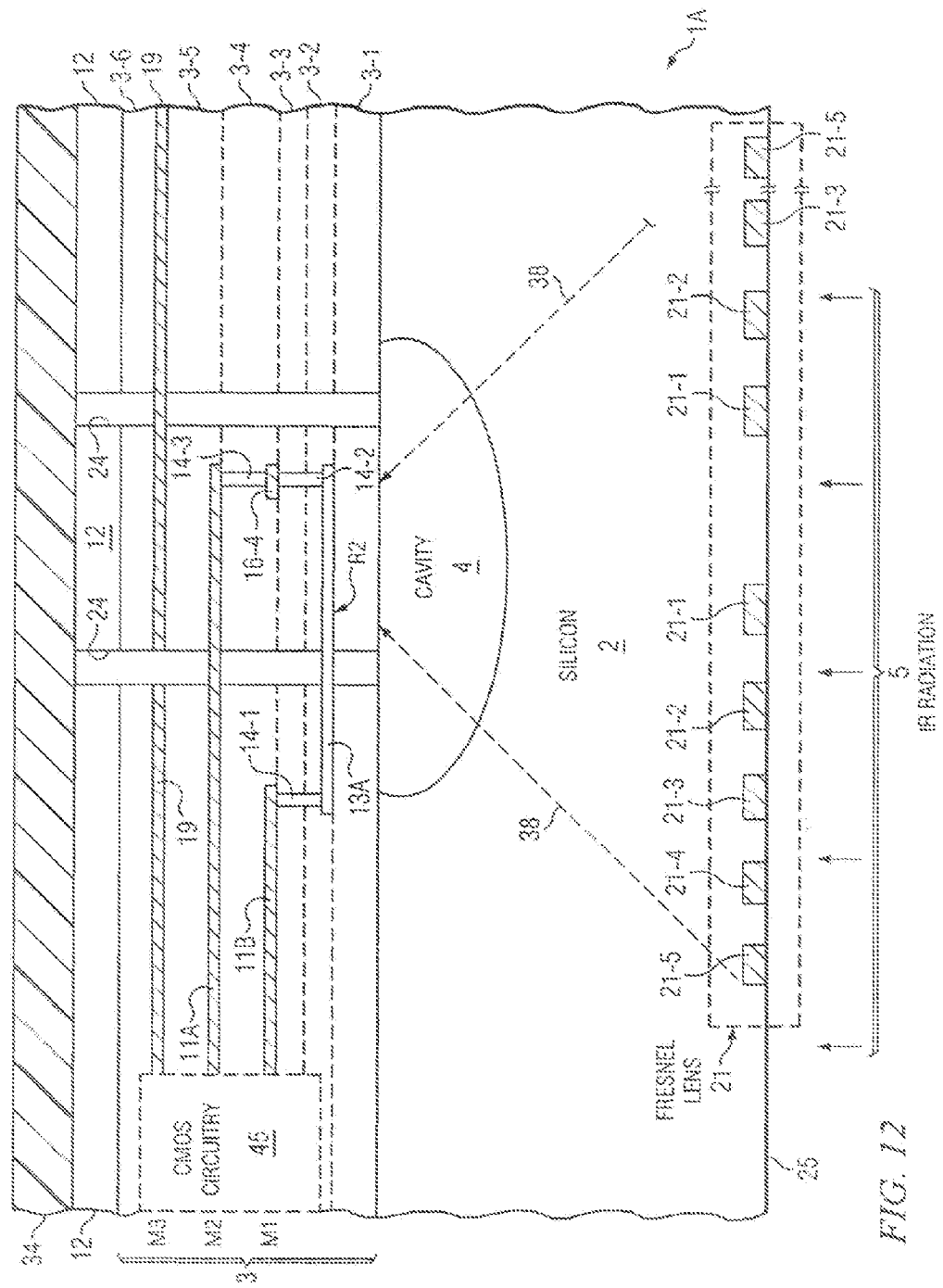
FIG. 12 is a section view of a CMOS-processing-compatible IR sensor chip similar to FIG. 3 but including temperature-sensitive resistors rather than thermocouples.

FIG. 12 is a section view of a CMOS-processing-compatible IR sensor chip similar to FIG. 3 but including temperature-sensitive resistors rather than thermocouple groups 7 and 8 of FIG. 3. In FIG. 3, thermocouple groups 7 and 8 are omitted, and instead a resistive layer 13A, which forms a thermally isolated resistor R2 above cavity 4, is connected between aluminum conductors 11A and 11B. As in FIG. 3, $SiO_2$ stack 3 in FIG. 12 includes multiple oxide layers 3-1, 2 ... 6 as required to facilitate fabrication, within $SiO_2$ stack 3, of resistor R2, tungsten contact layers 14-1, 14-2, and 14-3, first aluminum metallization layer M1, second aluminum metallization layer M2, third aluminum metallization layer M3, and various elements of CMOS circuitry in block 45. Resistive layer 13A on the portion of $SiO_2$ layer 13-1 directly over cavity 4 can be formed of any suitable temperature-sensitive resistive material, such as N-doped polycrystalline silicon. Cavity 4 therefore thermally insulates resistor R2 from silicon substrate 2.

Figure 13:
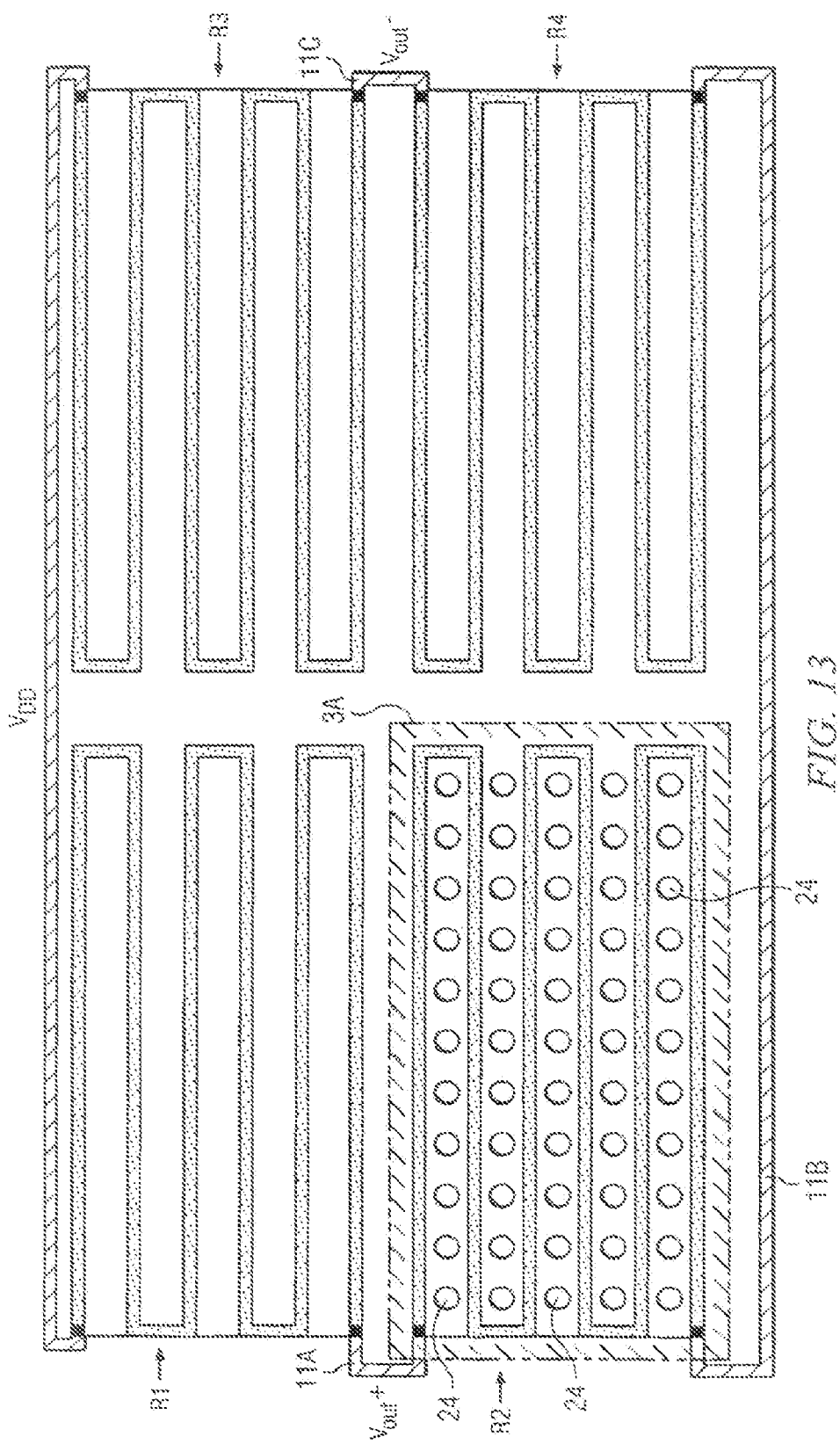
FIG. 13 is a plan view illustrating multiple temperature-sensitive resistors, including temperature sensitive resistor 13, connected to form a resistive bridge circuit in FIG. 12.
Figure 14:
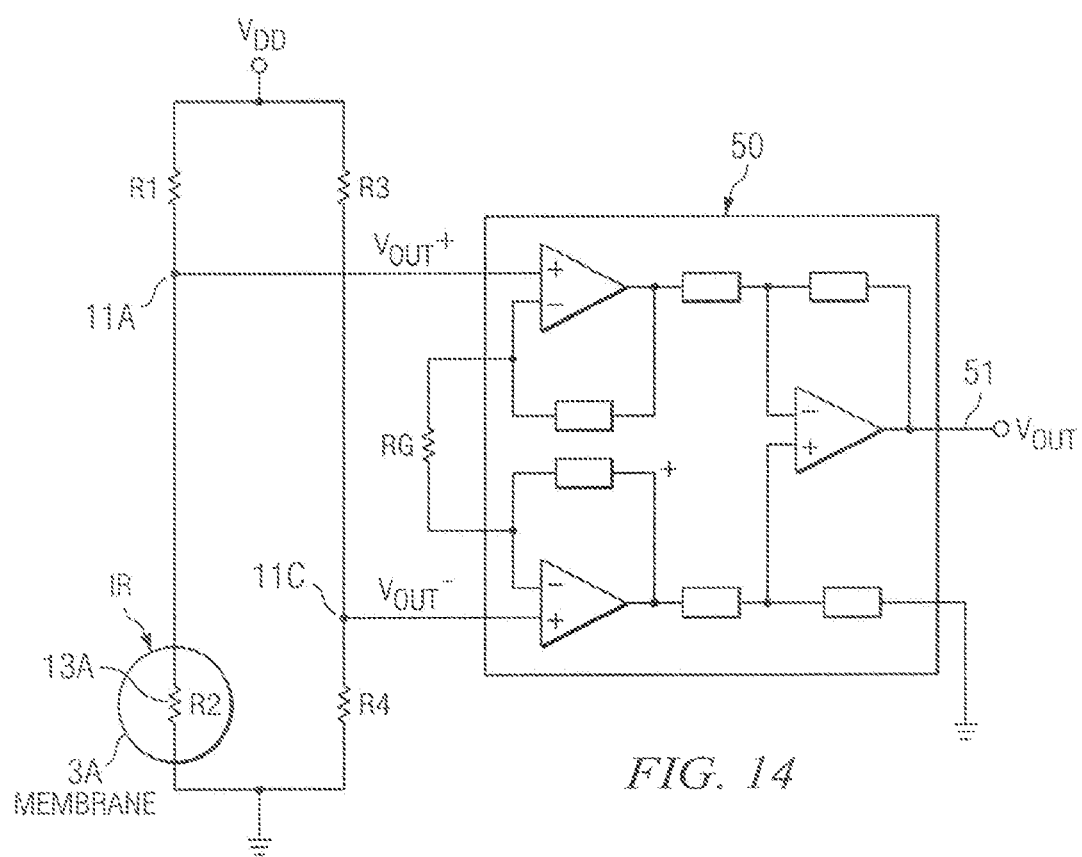
FIG. 14 is a schematic diagram illustrating the resistors of FIG. 12 connected to form a bridge circuit connected to associated amplifier circuitry included in CMOS circuitry 45 of FIG. 12.

FIG. 13 is a plan view that shows the layout of four identical resistors including the above mentioned temperature-sensitive resistor R2 and also resistors R1, R3 and R4, connected to form a resistive bridge circuit. As mentioned above, resistor R2 is formed on membrane region 3A directly over cavity 4. Resistors R1, R3 and R4 are not shown in FIG. 12, but are formed directly on a portion of $SiO_2$ layer 3-1 in CMOS circuitry 45 directly over silicon substrate 2 and hence are not thermally insulated from substrate 2. FIG. 14 shows the 4 resistors R1-R4 connected to form the bridge circuit, which is connected to associated amplifier circuitry 50. Resistors R1 and R2 are coupled between $V_{DD}$ and ground, the junction between them being connected by conductor 11A to apply a voltage Vout+ to an input of a conventional instrumentation amplifier 50 which produces an output voltage Vout on an output conductor 51. Resistors R3 and R4 also are coupled between $V_{DD}$ and ground, the junction between them being connected by conductor 11B to apply a voltage Vout− to another input of amplifier 50. Amplifier 50 is coupled to gain resistor $R_G$. Amplifier 50, gain resistor $R_G$, and resistors R1, R3, and R4 all are included in CMOS circuitry 45 of FIG. 12. Differential heating of thermally isolated resistor R2 relative to the heating of the other three resistors generates a small differential voltage between conductors 11A and 11C which then is amplified to produce Vout.

The use of bridge circuitry as described above increases the sensitivity of the IR sensor chip of FIG. 12. Specifically, the incoming IR radiation 12 heats up the "floating" portion 3A of $SiO_2$ membrane 3 and therefore changes the resistance R2, thereby generating the small differential voltage Vout+ minus Vout− between conductors 11A and 11C, which is further amplified by amplifier 50 to produce Vout.

The basic structure of the embodiment of the invention shown in FIGS. 12-14 is very similar to the structure of the previously described embodiments which include thermocouples. The resulting DC value can be "chopped" using a mechanical shutter. The mechanical shutter would be located in the path of the incoming IR radiation, for the purpose of removing the offsets when the IR radiation is not present. For example, if the chopper blocks the IR radiation, the offset of the system can be measured and then the same number subtracted from the output when the IR heats the membrane. The resulting very small resistance changes due to changes in the temperature of resistor R2 are directly proportional to the power of the incoming IR radiation. This allows detection of a very broad spectrum of infrared radiation, because all incoming energy that produces heat can be captured. (This is in contrast to photodiodes that are sensitive to a narrow spectrum determined by their bandgap voltage.) The results of the IR radiation detection allow the temperature of the remote IR radiation source to be accurately computed in basically the same manner as for the previously described embodiments including thermopiles 7 and 8.

Thus, the invention provides an infrared sensor chip integrated into and forming a part of a package, thereby eliminating the need for a package having a window. The sensitivity of the sensor chip is greatly improved by providing an optical element, such as a Fresnel lens, formed directly on/in a back surface of the chip. This avoids the need for using expensive external infrared optics. In a described embodiment, the back side of the silicon sensor die utilized as part of a wafer scale chip package (WCSP) forms a window for IR radiation and functions as a visible light filter. The integration and precise self-alignment achievable by conventional photolithography allows the creation of the Fresnel lens in/on the silicon chip surface to collimate the beam and focus it on to the thermocouple group and thereby increase the sensor sensitivity, thereby integrating the lens, silicon sensor chip, and package at very low cost. The increase in sensitivity and the shaping of the field of view of the sensor makes it more suitable for measurement of the temperature of remote objects. The invention achieves very low cost by providing previously un-achieved very precise alignment of features on the front surface of the wafer with optical element features on the back surface of the wafer.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, it might be very advantageous to stack an infrared sensor chip of the present invention, which is manufactured using a relatively inexpensive process, onto a much more expensive digital integrated circuit chip manufactured using much more advanced, costly processing techniques and then mount the combination into a package having a window. Although the described embodiments of the thermocouples include polysilicon and titanium nitride, the basic invention is applicable to thermocouples of any workable composition.

What is claimed is:

1. An apparatus comprising:
   an integrated circuit (IC) that is configured to sense infrared radiation including first and second temperature-sensitive elements in a dielectric stack of the IC, wherein the first temperature-sensitive element being more thermally insulated from a substrate of the radiation sensor chip than the second temperature-sensitive element, and wherein the first and second temperature-sensitive elements include first and second thermocouple groups, respectively, connected in series to form a thermopile, and wherein the dielectric stack is a semiconductor process dielectric stack including a plurality of silicon dioxide sublayers and polysilicon traces, titanium nitride traces, tungsten contacts, and aluminum metallization traces between the various sublayers patterned to provide the first and second thermocouple groups connected in series to form the thermopile;
   a plurality of bonding pads on the radiation sensor chip coupled to the first and second temperature-sensitive elements;
   a plurality of bump conductors bonded to the bonding pads for physically and electrically connecting the radiation sensor chip to corresponding mounting conductors; and
   a diffractive optical element integrated with a back surface of the IC.

2. The apparatus of claim 1, wherein the optical element is a diffractive optical element, and wherein the first temperature-sensitive element is insulated from the substrate by means of a cavity between the substrate and the dielectric stack.

3. The apparatus of claim 2, wherein the diffractive optical element includes a Fresnel lens.

4. The apparatus of claim 3, wherein the Fresnel lens is a binary Fresnel lens formed of concentric regions etched into the back surface of the radiation sensor chip.

5. The apparatus of claim 3, wherein the Fresnel lens is a binary Fresnel lens formed of concentric rings of infrared-opaque material deposited on the back surface of the radiation sensor chip.

6. The apparatus of claim 2, wherein the diffractive optical element includes a diffraction grating.

7. The apparatus of claim 6, wherein the diffraction grating is formed of a plurality of elongated parallel rectangular regions etched into the back surface of the radiation sensor chip.

8. The apparatus of claim 3, wherein concentric regions of the Fresnel lens are circular.

9. The apparatus of claim 3, wherein the Fresnel lens includes at least approximately 100 concentric regions.

10. The apparatus of claim 5, wherein the infrared-opaque material is composed of metal.

11. The apparatus of claim 1, wherein the apparatus further comprises CMOS circuitry coupled between first and second terminals of the thermopile to receive and operate on a thermoelectric voltage generated by the thermopile in response to infrared radiation received by the radiation sensor chip, the CMOS circuitry also being coupled to the bonding pads.

12. The apparatus of claim 11, wherein the substrate is composed of silicon to pass infrared radiation to the thermopile and block visible radiation, and further including a passivation layer disposed on the dielectric stack and a plurality of generally circular etchant openings extending through the passivation layer and the dielectric layer to a cavity.

13. The radiation apparatus of claim 1, wherein the first and second temperature-sensitive elements include first and second resistive devices, respectively.

14. An apparatus comprising:
an integrated circuit (IC) that is configured to detect infrared radiation, wherein the IC includes:
a substrate having a first side and an opposite second side;
a dielectric stack formed over the first side of the substrate, wherein the dielectric stack includes:
a first dielectric layer formed over the substrate;
a first electrically conductive layer formed over the first dielectric layer, wherein cavity underlies at least a portion of the first electrically conductive layer;
a second dielectric layer formed over the first electrically conductive layer;
a second electrically conductive layer formed over the second dielectric layer, wherein cavity underlies at least a portion of the second electrically conductive layer;
a third dielectric layer formed over the second electrically conductive layer;
a metallization layer that is formed over the third dielectric layer, wherein the metallization layer includes a first portion, a second portion, and a third portion;
a first via that extends between the first electrically conductive layer and the first portion of the metallization layer;
a second via that extends between the second electrically conductive layer and the first portion of the metallization layer, wherein cavity underlies the first via, the second via, and the first portion of the metallization layer;
a third via that extends between the first electrically conductive layer and the second portion of the metallization layer; and
a fourth via that extends between the second electrically conductive layer and the and the third portion of the metallization layer;
a passivation layer formed over the dielectric stack;
a channel that extends through the dielectric stack and the passivation layer;
a cavity formed in the substrate by the introduction of an etchant through the channel, wherein the cavity underlies at least a portion of the dielectric stack;
a lens formed over the second side of the substrate; and
a plurality of bond pads formed on the first side of the substrate, wherein at least one of the bond pads is coupled to the dielectric stack; and
a circuit board having a plurality of conductive bumps, wherein each conductive bump is secured to and in electrical contact with at least one of the bond pads so that the infrared radiation is received by the IC at the second side of the substrate.

15. The apparatus of claim 14, wherein the IC further comprises a cap layer formed over the passivation layer, and wherein the cap layer seals the channel.

16. The apparatus of claim 15, wherein the lens further comprises a Fresnel lens.

17. The apparatus of claim 16, wherein the first electrically conductive layer is doped polysilicon, and wherein the second electrically conductive layer is formed of titanium nitride, and wherein the metallization layer is formed of aluminum.

18. The apparatus of claim 17, wherein the bump conductors are formed of a lead-tin alloy.

19. The apparatus of claim 18, wherein the IC further comprises circuit formed on the substrate and that is coupled between the dielectric stack and at least the bond pads.

20. An apparatus comprising:
an integrated circuit (IC) that is configured to detect infrared radiation, wherein the IC includes:
a substrate having a first side and an opposite second side;
a dielectric stack having a first thermopile junction that is formed over first side of the substrate, a second thermopile junction that is formed over first side of the substrate and that is spaced apart from the first thermopile junction, and an interconnect that is coupled to each of the first and second thermopile junctions, wherein the dielectric stack includes:
a first dielectric layer formed over the silicon layer;
a first electrically conductive layer formed over the first dielectric layer, wherein the first electrically conductive layer includes a portion that forms part of the first thermopile junction;
a second dielectric layer formed over the first electrically conductive layer wherein the second electrically conductive layer includes a portion that forms part of the first thermopile junction;
a second electrically conductive layer formed over the second dielectric layer;
a third dielectric layer formed over the second electrically conductive layer;
a metallization layer that is formed over the third dielectric layer, wherein the metallization layer includes a first portion, a second portion, and a third portion;
a first via that extends between the portion of the first electrically conductive layer and the first portion of the metallization layer; and
a second via that extends between the portion of the second electrically conductive layer and the first portion of the metallization layer;
a passivation layer that is formed over the dielectric stack;
a channel that extends through the dielectric stack and the passivation layer;
a cavity formed in the silicon layer by the introduction of an etchant through the channel, wherein the cavity underlies the first thermopile junction, and wherein the cavity underlies at least a portion of the interconnect;
a lens formed over the second side of the substrate; and
a plurality of bond pads formed on the first side of the substrate, wherein at least one of the bond pads is coupled to the dielectric stack; and
a circuit board having a plurality of conductive bumps, wherein each conductive bump is secured to and in electrical contact with at least one of the bond pad so that the infrared radiation is received by the IC at the second side of the substrate.

21. The apparatus of claim 20, wherein the lens further comprises a Fresnel lens.

22. The apparatus of claim 21, wherein the portion of the first electrically conductive layer further comprises a first portion of the first electrically conductive layer, and wherein the portion of the second electrically conductive layer further comprises a first portion of the second electrically conductive layer, and wherein the second thermopile junction further comprises:

a second portion of the first electrically conductive layer;
a third via that extends between the second portion of the first electrically conductive layer and the second portion of the metallization layer;
a second portion of the second electrically conductive layer; and
a fourth via that extends between the second portion of the second electrically conductive layer and the third portion of the metallization layer.

23. The apparatus of claim 22, wherein the interconnect further comprises:
a third portion of the first electrically conductive layer that is coupled to the first and second portions of the first electrically conductive layer; and
a third portion of the second electrically conductive layer that is coupled to the first and second portions of the second electrically conductive layer.

24. The apparatus of claim 23, wherein the apparatus further comprises a cap layer formed over the passivation layer, wherein the cap layer seals the channel.

25. The apparatus of claim 24, wherein the bump conductors are formed of a lead-tin alloy.

26. The apparatus of claim 25, wherein the IC further comprises circuit formed on the substrate and that is coupled between the dielectric stack and at least the bond pads.

* * * * *